United States Patent
Wang et al.

(10) Patent No.: US 7,531,766 B2
(45) Date of Patent: May 12, 2009

(54) SHEET METAL ASSEMBLY AND METHOD TO REDUCE WEIGHT

(75) Inventors: Pei-Chung Wang, Troy, MI (US); Joseph James Speranza, Rochester Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/151,839

(22) Filed: Jun. 14, 2005

(65) Prior Publication Data

US 2005/0230361 A1    Oct. 20, 2005

Related U.S. Application Data

(63) Continuation-in-part of application No. 10/408,770, filed on Apr. 7, 2003, now abandoned.

(51) Int. Cl.
*B23K 11/16*    (2006.01)

(52) U.S. Cl. .................................................... 219/118
(58) Field of Classification Search ............ 219/121.84, 219/78.01, 118
See application file for complete search history.

(56) References Cited

U.S. PATENT DOCUMENTS 5,599,467 A * 2/1997 Okabe et al. ................ 219/118
6,107,595 A * 8/2000 Peterson ..................... 219/118

\* cited by examiner

*Primary Examiner*—Kevin P Kerns

(57) ABSTRACT

A sheet metal assembly includes first and second resistance weldable metal sheets having flanges extending from the sheets. The flanges overlap in parallel for a dimension. A resistance weldable metal shim is disposed between the flanges and extends to the outer edges thereof. A weld joins the metal sheets through the shim. The shim increases the mechanical strength of the assembly. The increase in mechanical strength from the shim allows for reductions to the flange width. As a result, a lighter assembly of equivalent strength is produced.

18 Claims, 3 Drawing Sheets

SHEET METAL ASSEMBLY AND METHOD TO REDUCE WEIGHT

CROSS-REFERENCE TO RELATED APPLICATIONS

This application is a Continuation-In-Part of U.S. patent application Ser. No. 10/408,770, filed Apr. 7, 2003 and now abandoned.

TECHNICAL FIELD

This invention relates to joining overlapping flanges of metal sheets by spot or seam welding wherein the flange width may be reduced by inserting a shim between the flanges.

BACKGROUND OF THE INVENTION

It is known in the art to overlap the ends of two pieces of sheet metal to create flanges which are welded together between their edges to join the metal sheets. The flange overlap permits spot welding or resistance seam welding to be performed and the strength of the joint is known to vary with the amount of overlap. However, the overlap also adds to the weight of the welded panels or other assemblies, such as may be used in automotive bodies. A means and method for reducing welded assembly weight was desired.

SUMMARY OF THE INVENTION

As used in the specification and claims, the term "resistance weldable metal" is intended to indicate metals and alloys capable of forming electrical resistance welded joints having tensile strength equal to or greater than that of the metal adjacent to the joints.

The present invention provides a means and method for reducing the weight or increasing the mechanical performance of overlapping flange welded joints of sheet metal panels or other assemblies made of resistance weldable metals (other than base aluminum) and used in automotive vehicles. The inventors have found that adding a thin shim between the overlapping flanges of two sheets increases the mechanical strength of the joint or allows the flanges to be made narrower.

Narrowing the flanges reduces the weight of the assemblies because the weight of the added shim is generally much less than the weight reduction due to narrowing of the flanges. Thus, the use of this invention can provide significant weight reductions in vehicle structures where overlapping flange welding is extensively used.

These and other features and advantages of the invention will be more fully understood from the following description of certain specific embodiments of the invention taken together with the accompanying drawings.

DESCRIPTION OF THE PREFERRED EMBODIMENT

Figure 1:
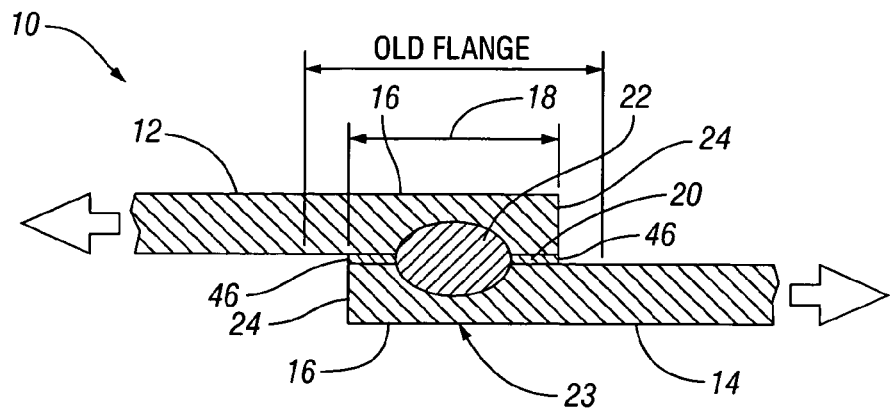
FIG. 1 is a cross-sectional view of a spot welded linear flange assembly including a shim according to the present invention.
Figure 2:
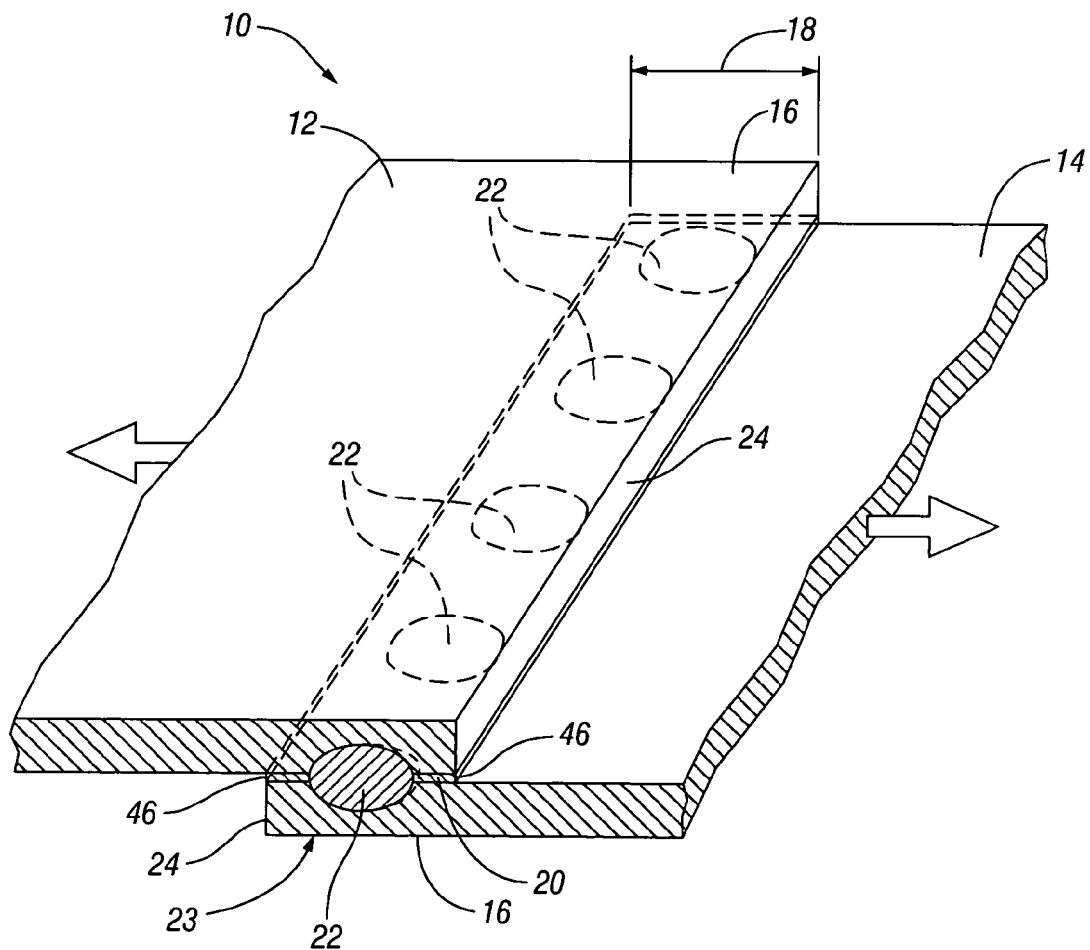
FIG. 2 is a cross-sectioned isometric view of the assembly of FIG. 1.

Referring first FIGS. 1 and 2 of the drawings, numeral 10 generally indicates a structural assembly such as a panel or portion of a frame for automotive use. Assembly 10 includes first and second metal sheets 12, 14 having overlapping portions defining linearly extending flanges 16 overlapped by a dimension 18. A shim 20 is disposed between the flanges 16 and extends the length of the overlap dimension 18. The components of assembly 10 are joined by spot welds 22 spaced longitudinally along the resulting welded joint 23. The extent of outer edges 24 of the flanges beyond the welds 22 affects the strength of the joint because the flange portions act as lever arms with pivots at the weld that influence the effective force on the weld of tension forces tending to draw the metal sheets apart.

The process of spot welding involves inserting shim 20 between spaced overlapping flanges 16 of the first and second sheets 12, 14. The flanges 16 and the shim 20 are then held together and secured by welds 22 between the flanges 16 and the shim 20 at the predetermined spaced locations. The welds 22 are created by electric resistance spot welding or arc welding.

Figure 3:
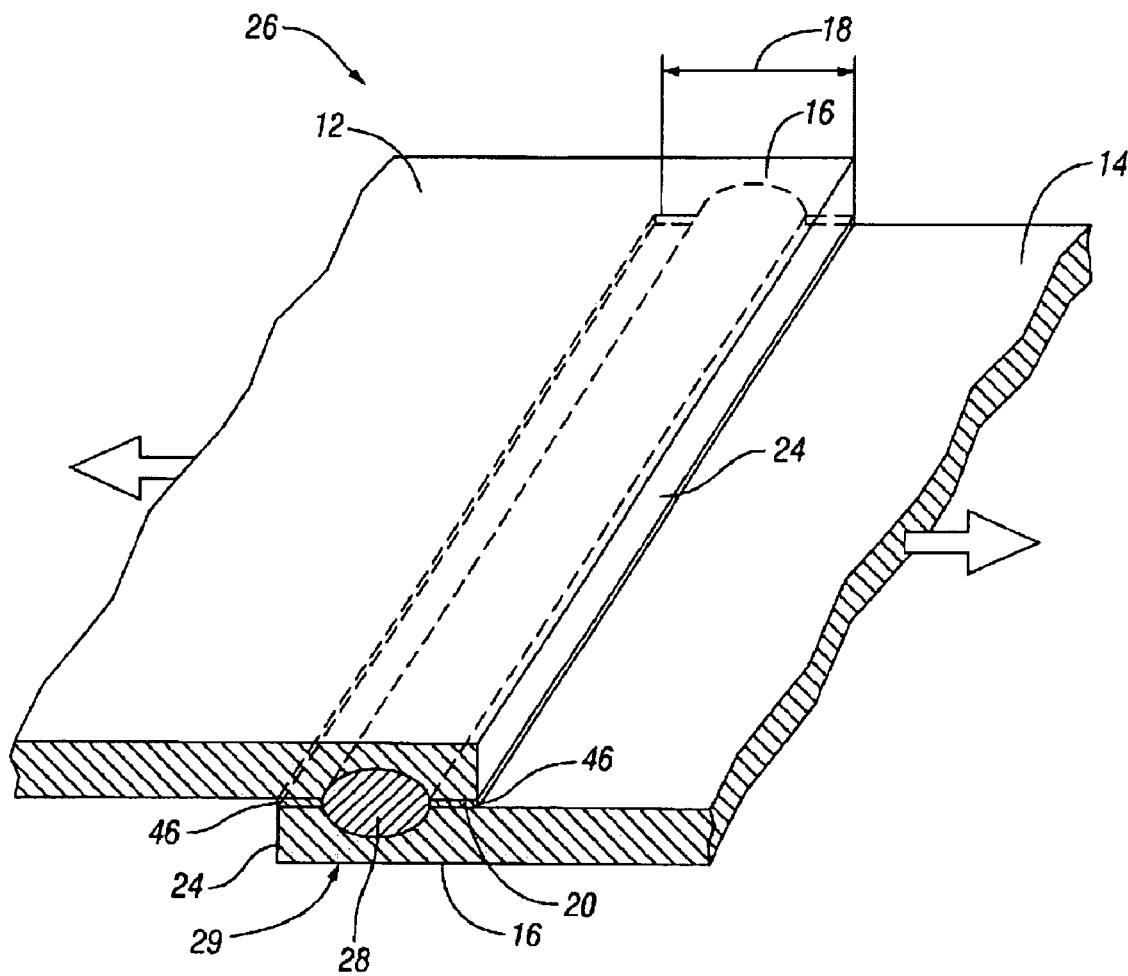
FIG. 3 is a view similar to FIG. 2 showing a seam welded assembly.

Referring now to FIG. 3 of the drawings, numeral 26 generally indicates a variation of the assembly 10 of FIGS. 1 and 2 using most of the same components as indicated by like numerals. Assembly 26 differs in that the spot welds 22 of FIGS. 1 and 2 are replaced by seam weld 28 extending the length of the joint 29 formed by the overlapping flanges 16 with the shim 20 between the flanges. A pair of roller electrodes roll along the flange of the assembly 26 and generate welding current to create the seam weld 28 through the shim 20 between the first and second sheets 12, 14. Alternatively, laser welding may also create seam weld 28.

Figure 4:
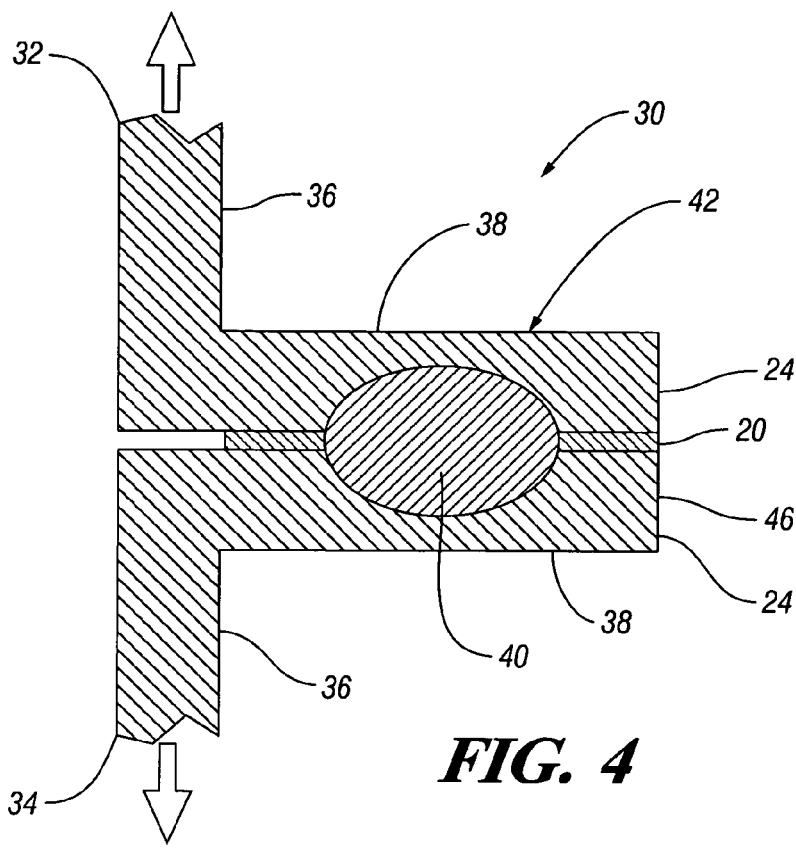
FIG. 4 is a cross-sectional view of a spot welded lateral flange assembly including a shim according to the present invention.

Referring now to FIG. 4 of the drawings, numeral 30 generally indicates an assembly representing an alternative embodiment of the invention. Assembly 30 includes first and second metal sheets 32, 34. The metal sheets 32, 34 include main bodies 36 and flanges 38 extending at right angles from adjacent edges of the sheet bodies 36. The flanges 38 extend in opposed overlapping relation to one another. A shim 20 is disposed between the flanges 38 as in the assembly 10. The flanges 38 are joined together through the shim 20 by resistance spot welds 40 to form a joint 42. Alternatively, a seam weld may be used to join the flanges 38.

In accordance with the invention, the shim 20 is formed of a metal that is at least as hard as the metal sheets. In the linear flange assembly 10 the width and length of the shim 20 are preferably equal to the overlap area of the flanges. In the angular flange assembly 30, the width of the shim should extend through the weld to the outer edges of the flanges 38. The thickness of shim 20 is between 0.01 and 0.3 mm when the flange thickness of the sheet metal welding is 0.8 mm. In this example, the ratio between the shim and the flange thickness varied between 0 and 40 percent.

Preferably, the length of the shim 20 should be as long as the welded joint. However, the length of the shim 20 may be shorter than the joint and could be interrupted between weld locations.

Figure 5:
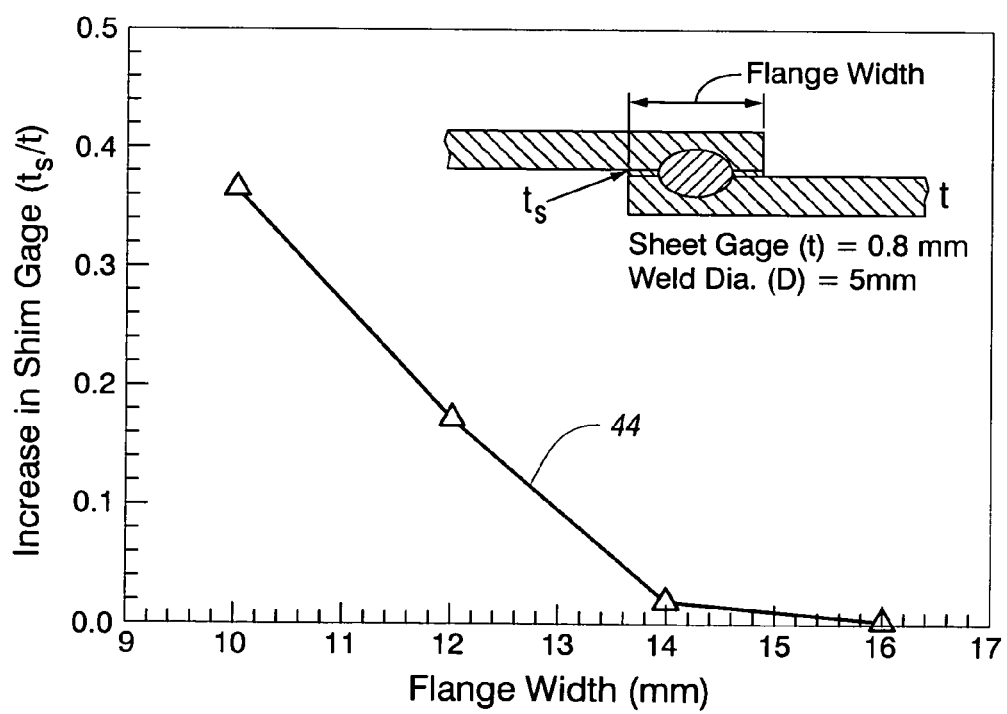
FIG. 5 is a graph relating shim thickness to flange width reduction for a specific linear flange example.

FIG. 5 is a graph of the relationship between flange width and shim size based on calculations of linear flange joints of assemblies with a 0.8 mm sheet gage and a spot weld diameter of 5 mm. A significant reduction in flange width can be accomplished by inserting a small shim between the metal sheets. The line 44 indicates that, as the shim thickness $t_s$ is increased relative to the thickness t of the sheets to be welded, the flange width can be reduced while maintaining the same mechanical joint strength.

When the sheet gage is 0.8 mm and the spot weld diameter is 5 mm, substantial flange width reductions can be made by inserting a shim having a thickness between about 0.01 mm and 0.3 mm. The most efficient reductions in flange width are made between 16 and 14 mm. Under 14 mm flange width, the thickness of the shim must be increased at a greater rate to allow for further flange width reductions. In this example, the ratio between the shim and the flange thickness varied between 0 and 40 percent.

In use of the welded assembly 10 of FIGS. 1 and 2, when the metal sheets 12, 14 are loaded in tension linearly in the direction of the arrows, the offset metal sheets 12, 14 begin to rotate about the weld 22 causing the flanges 16 to bend. They rotate because they are overlapping and do not lie in the same plane. If the rotational forces pulling the assembly 10 apart are excessive, the joint 23 fails.

The overlap 18 of the flanges 16 affects the mechanical strength of the joint 23. As the overlap 18 is reduced, the strength of the joint is decreased because the edge effect caused by the reduction of overlap 18 increases local stresses around the periphery of the weld 22.

Increasing the overlap 18 of the flanges 16 tends to increase the mechanical strength of the weld 22, however once the overlap 18 is made wider than a threshold value, the overlap 18 tends to have little effect on the local stresses around the weld 22. However, it is preferable not to increase the width of the flanges 16 because it increases the weight of the assembly 10.

Instead of increasing the strength of the assembly 10 with a wider flange, a shim 20 may be disposed between the flanges 16. The shim 20 increases the mass at the joint which improves the mechanical strength of the assembly 10. The shim 20 increases the mechanical strength of the flanges 16, apparently by effectively making them thicker and harder to bend. As a result, when the assembly 10 is loaded in tension linearly in the direction of the arrows, the flanges 16 supported by the shim 20 resist the rotation of the joint 23, thereby making the joint 23 stronger.

The increase in mechanical strength created by the shim 20 and weld 22 allows for greater reductions in flange width without reducing the strength of the assembly 10. Therefore, a shim 20 can be used to increase the strength between two metal sheets 12, 14 having a reduced flange width.

Referring now to FIG. 3, in use the assembly 26 reacts similarly to assembly 10 of FIGS. 1 and 2. The shim 20 of assembly 26 increases the mechanical strength of the seam welded joint 29 in the same way it does the spot welded joint 23 of assembly 10.

The assembly 30 of FIG. 4 also reacts similarly to the assembly 10. The shim 20 of assembly 30 increases the mechanical strength of the spot welded joint 42 in a manner similar to assembly 10. However, since separating tension on the sheets 32, 34 tends to pivot the flanges 38 about a single pivot point 46, the shim 20 need not extend to the inner edges of the flanges but only, preferably, to the outer edges 24.

When a shim is used to reduce flange width in an automotive sheet metal assembly or automotive frame, a substantial weight reduction can be obtained. To obtain a reduction in weight, the shim added to the assembly must weigh less than the flange material being removed.

The improved strength and/or reduced weight of structures made by the method of the present invention are believed applicable to all metals which are capable of being successfully welded to form flanged joints of adequate strength. This may not apply to base aluminum structures which fail to form weld joints of adequate strength when resistance welded. However, aluminum alloys having adequate electrical resistance to form strong welds should be capable of improved strength or reduced weight by use of the novel method.

Other resistance weldable metals that can form stronger or lighter joints by use of the method include the following examples.

Steel (both bare and coated). Includes:

conventional steels (e.g. low carbon, bake hardenable, high strength low alloy, solid solution strengthened steel);

advanced high strength steels (e.g. dual phase (DP) steel, complex phase steel, transformation induced plasticity (TRIP) steel, martensitic steel, Boron steel); and stainless steel.

Magnesium alloys. Includes magnesium-aluminum-zinc alloys (e.g. AZ31B, AZ61A, AZ63A, AZ80A, AZ81A, AZ91 and AZ92A.

Nickel alloys—(e.g. Ni—Cu, Ni—Si, Ni—Mo, Ni—Cr—Fe and Ni—Cr—Mo

Titanium and its alloys. Unalloyed titanium (98.5-99.5% Ti) and all alpha titanium alloys.

Copper alloys (e.g. copper beryllium alloy).

As used in the claims, the term "resistance weldable metal" is intended to indicate metals and alloys capable of forming electrical resistance welded joints having tensile strength equal to or greater than that of the metal adjacent to the joints.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The invention claimed is:

1. A method of welding sheets of metal by flanges at edge portions of the sheets, the method comprising the steps of:
   disposing the flanges of the metal sheets in opposed overlapping relation;
   disposing a metal shim between and engaging the flanges, the shim extending to outer edges of the flanges; and
   resistance welding the flanges together through the shim at at least one location spaced inward from the outer edges of the flanges;
   wherein the shim outer edges remain chemically and mechanically intact and the shim is formed of a metal having substantially similar metallurgical and mechanical characteristics to those of the metal sheets.

2. A method as in claim 1 wherein the sheets are spot welded together.

3. A method as in claim 1 wherein the sheets are resistance seam welded together.

4. A method as in claim 1 wherein the length of the shim is the same as the length of the sheets.

5. A method as in claim 1 wherein the length of the shim is interrupted between spaced weld locations.

6. A method as in claim 1 wherein the shim is a solid element having a hardness not less than that of the flanges of the metal sheets.

7. A method as in claim 1 wherein the shim thickness is chosen to increase joint strength sufficiently to compensate for a reduction in flange width with a resultant reduction in assembly weight.

8. A method as in claim 1 wherein the flanges extend linearly from the sheets and the shim has a width equal to the flange width.

9. A method as in claim 1 wherein the flanges extend angularly from the sheets so that the sheets are coplanar and the shim extends from the outer edges of the flanges inwardly to a position beyond the weld.

10. A method as in claim 9 wherein the width of the shim is substantially less than the width of the flanges.

11. A method as in claim 1 wherein the shim has a thickness less than half that of one of the flanges.

12. A method as in claim 11 wherein the shim has a thickness between 1 percent and 40 percent of the flange thickness.

13. A method of reducing weight of metal sheets welded at lapped flanges, the method comprising:

reducing the width of the lapped flanges;

inserting a metal shim between the flanges, the thickness of the shim being substantially less than the thickness of the sheets; and resistance welding the flanges together through the shim;

wherein the shim outer edges remain chemically and mechanically intact and the shim is formed of a metal having substantially similar metallurgical and mechanical characteristics to those of the metal sheets;

thereby providing a welded assembly of equivalent strength and reduced weight.

14. A method as in claim 13 wherein the metal sheets and the shim are formed from a metal other than aluminum.

15. A method of resistance welding sheets of metal by flanges at edge portions of the sheets, the method comprising the steps of:

disposing the flanges of the metal sheets in opposed overlapping relation;

disposing a metal shim between and engaging the flanges, the shim extending to outer edges of the flanges; and resistance welding the flanges together through the shim at at least one location spaced inward from the outer edges of the flanges;

wherein the shim outer edges remain chemically and mechanically intact and the shim is formed of a metal having substantially similar metallurgical and mechanical characteristics to those of the metal sheets; and wherein the metal sheets and the shim are formed from a metal other than aluminum.

16. A method as in claim 15 wherein the flanges extend linearly from the sheets and the shim has a width equal to the flange width.

17. A method as in claim 15 wherein the flanges extend angularly from the sheets so that the sheets are coplanar and the shim extends from the outer edges of the flanges inwardly to a position beyond the weld.

18. A method as in claim 17 wherein the width of the shim is substantially less than the width of the flanges.

* * * * *